Figure 1:
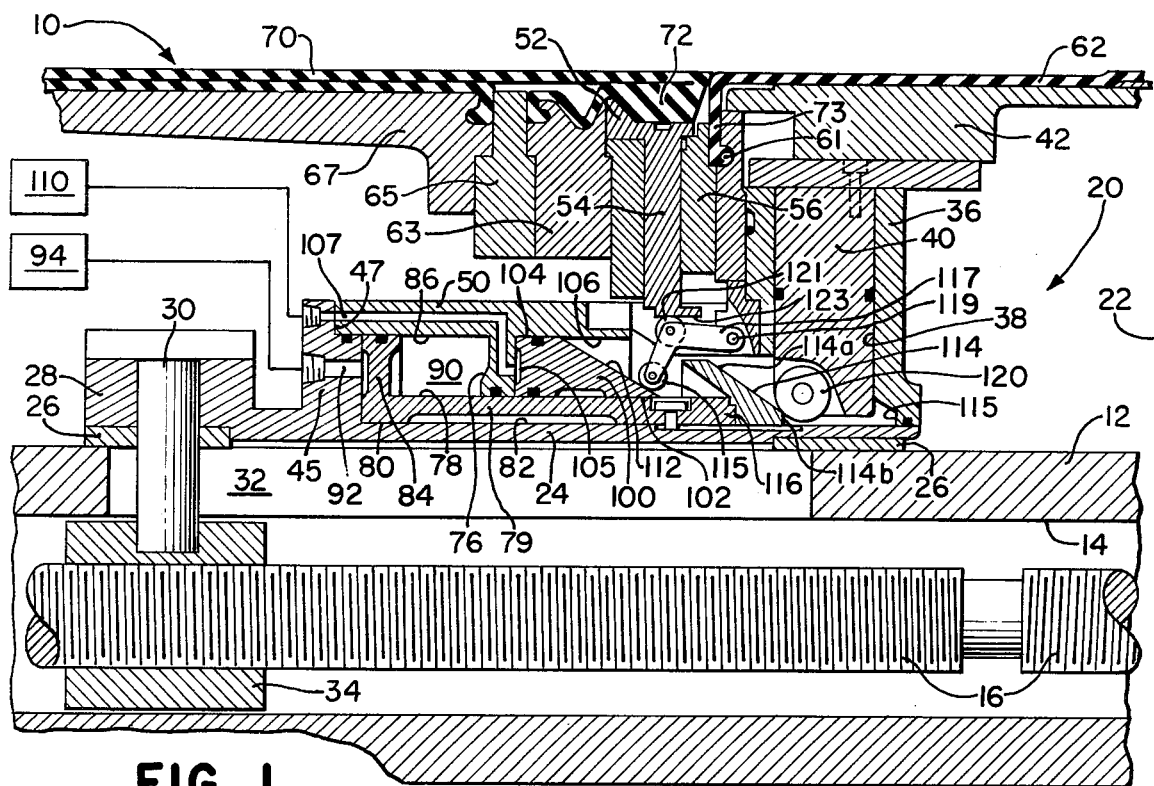

United States Patent [19]

Felten et al.

[11] 4,239,579
[45] Dec. 16, 1980

[54] TIRE BUILDING DRUM

[75] Inventors: Gilbert A. Felten, Kehlen, Luxembourg; Jean-Marc Dupommier, Athus, Belgium

[73] Assignee: The Goodyear Tire & Rubber Company, Akron, Ohio

[21] Appl. No.: 42,399

[22] Filed: May 25, 1979

[51] Int. Cl.³ .................... B29H 17/16; B29H 17/22
[52] U.S. Cl. .................... 156/398; 156/401; 156/415; 156/417; 156/132
[58] Field of Search .................... 156/123 R, 131, 132, 156/394 R, 398, 401, 403, 414–420

[56] References Cited

U.S. PATENT DOCUMENTS

| | | | |
|---|---|---|---|
| 3,698,987 | 10/1972 | Woodhall et al. | 156/401 |
| 3,767,509 | 10/1973 | Gazuit | 156/415 |
| 3,784,426 | 1/1974 | Woodhall et al. | 156/401 |
| 3,816,218 | 6/1974 | Felten | 156/398 |
| 4,010,058 | 3/1977 | Kubinski et al. | 156/415 |
| 4,087,306 | 5/1978 | Head et al. | 156/401 |

*Primary Examiner*—John E. Kittle
*Attorney, Agent, or Firm*—R. S. Washburn

[57] ABSTRACT

A tire building drum having radially expandable shoulder forming means and radially expandable bead seating means. The drum includes an independently operable pair of annular pistons associated respectively with the shoulder forming means and the bead setting means such that the shoulder forming means can be operated independently in time, in radial extent and in force applied, of the bead seating means. The latter is in like manner operable independently in time, in radial extent, and in force applied at the bead setting means. The foregoing abstract is not to be taken as limiting the invention of this application, and in order to understand the full nature and extent of the technical disclosure of this application, reference must be made to the accompanying drawing and the following detailed description.

10 Claims, 2 Drawing Figures

TIRE BUILDING DRUM

The present invention relates to tire building, in particular to a tire building drum having shoulder forming means and bead seating means each of which means is operable in complete independence of the other means.

It has been proposed previously, for example in U.S. patents to E. S. Woodall No. 3,698,987 and No. 3,784,426, to employ axially movable pistons having annular ramps cooperable with roller means to elevate first a plurality of bead clamp fingers and then to elevate the radial segments providing the drum shoulder. Later, Felten, in U.S. Pat. No. 3,816,218 proposed a tire building drum wherein a two part piston provided with inclined ramps, again cooperated first with a roller link to elevate bead clamp segments and subsequently to elevate the shoulder forming segments of the drum. While these tire building drums were satisfactory, the former had the deficiency of a fixed outside diameter of the bead fingers which clamped the bead rings and was thus unduly sensitive to variations in the thickness of the ply material between the bead rings and the clamp fingers. In the Felten tire building drum, there existed a tendency for the shoulder segments to be moved up prematurely, being restrained only by the center bladder of the drum. In use, repeated stress thus applied on the center bladder could cause the bladder to grow in axial length. In time the shoulder segments could be moved far enough to pull the ply out from beneath the beads so as to cause undesirable variations in the cord length of tires constructed on such drums.

The primary object of the present invention is an improved tire building drum in which the mentioned disadvantages of the prior drums are reduced or eliminated.

A further object of the invention is the provision of a tire building drum having both means for expanding the shoulder portions and means for expanding bead seating means which means are operable independently of each other.

Another object of the invention is the provision of a tire building drum having means for expanding drum shoulders and means for expanding bead seating means in which the radial expansion of the shoulder means is independent of the radial expansion of the bead seating means.

The foregoing objects and others which will become apparent from the description herein below are accomplished in accordance with the invention in a tire building drum having a rigid drum end assembly including a mounting sleeve mounted coaxially and slidably along a center shaft, bead seating means arranged coaxially of and spaced circumferential around said sleeve mounted in said assembly to expand radially an elastic nose ring, drum shoulder forming means mounted in the assembly for movement radially of the shaft to expand an end of a drum center membrane adjacent to the elastic nose ring, first means disposed coaxially of and around the sleeve for movement axially thereof to effect uniform radially outward force and movement of one of said bead seating means and said drum shoulder forming means independently of the other thereof, and second means disposed coaxially of and around said sleeve for movement axially thereof to effect uniform radially outward force and movement of the other of said bead seating means and drum shoulder means independently of said one thereof.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings, FIG. 1 is an axial cross section view of a portion of a tire building drum illustrative of an embodiment of the invention.

Figure 2:
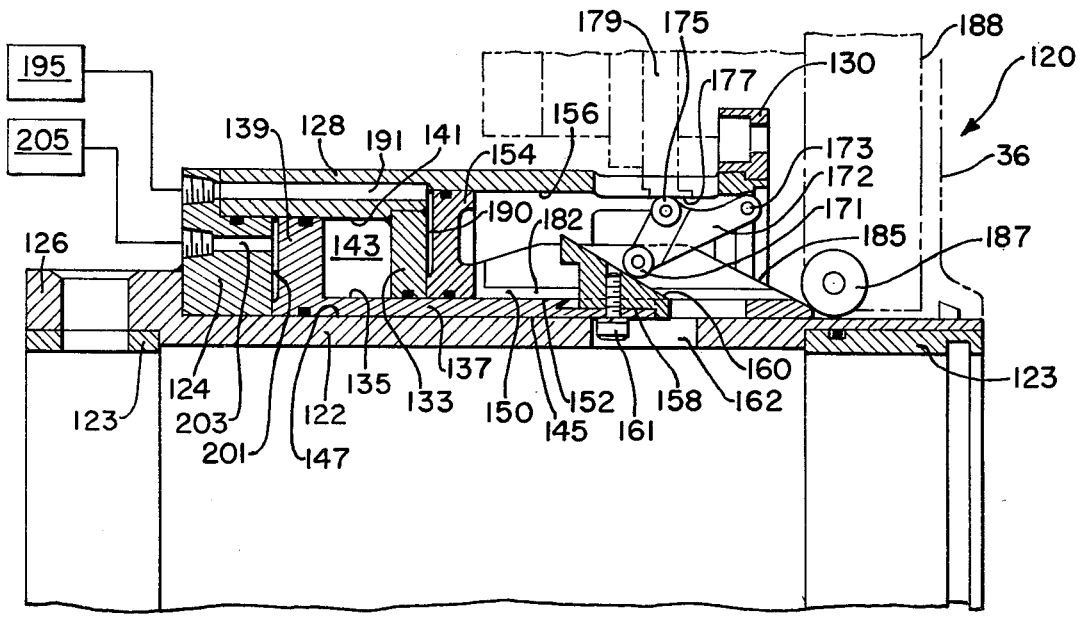

FIG. 2 is a view in axial cross section of a drum illustrating a different embodiment of the invention, the parts of which drum similar to the drum of FIG. 1 have been omitted.

A tire building drum 10, FIG. 1, embodying the invention comprises a center shaft 12 having a coaxial bore 14 in which an operating screw 16 is rotably mounted and a drum end assembly 20 which provides firm axial and circumferential support for a tire building surface of level cylindrical form. The tire building drum includes two end assemblies, 20,20 only one of which is shown, the other being identical but opposite in hand. By operation of the screw the respective drum end assemblies are moved axially along the shaft symmetrically toward and away from a mid circumferential plane 22 of the drum.

Each end assembly includes a main sleeve 24 having slide bushings 26 fixed therein which are slidably fitted to the cylindrical surface of the shaft 12. The sleeve is provided with two bosses 28, spaced 180 degrees apart, only one of which is shown. Each boss accommodates a stud 30 which extends through a longitudinal slot 32 in the shaft and is connected to a nut 34 in threaded engagement with the operating screw by which the axial movement of the end assembly is accomplished.

The end assembly 20 includes an annular housing 36 having a plurality of radially oriented circumferentially spaced slideways 38, each of which provides radial guidance for the stem 40 of a drum shoulder segment 42. The housing 36 is fixed on the main sleeve 24.

The main sleeve has a flange 45 extending radially outwardly, near the boss 28, which is provided with a circumferential recess 47 or an equivalent structure to which an outer cylinder wall 50 is secured. The cylinder wall extends axially from the flange 45 and is fixed in its axial relation to the housing 36. A plurality of bead seating segments 52 are arranged circumferentially spaced equally about the shaft 12, each having a radially inwardly extending leg 54 which is slidable in a bead seating housing 56 secured to the housing 36 being also arranged to clamp concentrically to the housing 36 the circular edge 61 of a drum center membrane 62.

To the bead seating housing 56 there are connected, by bolts or the like, a spacer ring 63, a port ring 65, and a drum extension 67 which cooperate to support the turnup bladder 70. The bladder 70 is provided with an integral elastomeric bead seating nose ring 72 which is disposed concentrically around the bead seating segments 52. The outer cylindrical surfaces of the membrane 62 and of the turn-up bladder 70 are at the same radial level and the nose ring 72 is closely adjacent axially to the inwardly turned edge portion 73 of the center membrane so as to provide an axially as well as circumferentially continuous building surface.

The outside diameter of the center shaft 12 is determined by the stiffness of the shaft required to support the mass of the tire building drum 10. The diameter of the building surface is dictated by the dimensions of the tire to be built on the drum and particularly by the dimensions of the inextensible bead rings to be included in the tire. The radial space therefore between the outside surface of the center shaft and the building surface is limited particularly in drums for building small diameter tires. It is necessary also to have precision guidance of the radially moving members such as the legs 54 of the bead seating segments and the stems 40 of the drum shoulder segments. Thus the space available for suitable actuating means to effect the radial movement is limited. Of the numerous proposals for the solution of this problem, the patents mentioned above have provided generally satisfactory approaches but suffered certain disadvantages as indicated.

In the drum of FIG. 1, the cylinder outer wall 50 is provided with a divider or septum which extends as an annular 76 flange radially inwardly to slidably sealed contact with the radially outer cylindrical surface 78 of a first piston 79, the radially inner surface 80 of which is slidably fitted to the radially outer surface 82 of the main sleeve 24. The piston head 84 formed integrally of the piston 79 extends radially outward to slidably sealed contact with the radially inner surface 86 of the outer cylinder wall 50. The piston head 84 can reciprocate axially within the chamber 90 between the flange 45 and the flange 76 of the cylinder outer wall. Controlled pressure, which may include super-or sub-atmospheric pressure, is admitted by way of a passage 92 which is connected to suitable valve means 94 for controlling the air admitted to or exhausted from the chamber 90. It will be appreciated that the passage is shown schematically and in the actual drum will be rotated from the boss sufficiently to provide convenient access for suitable fitting communicating with the valve means.

A second annular piston 100 has its radially inner cylindrical surface 102 slidably engaged with the outer cylindrical surface 78 of the first piston 79 and its radially outer surface 104 slidably engageable with the radially inner surface 106 of the cylinder outer wall 50 so that the second piston 100 is movable axially of the main sleeve 24 in response to controlled air pressure in the chamber 105, which may be super-or sub-atmospheric, supplied by way of the passage 107 in the outer cylinder wall by second valve means 110 independent of the first valve means 94. The piston 100 is provided with a ramp 112 which is circumferentially continuous and is engaged by the rollers 115 carried respectively by bifurcated bell crank links 117 which in turn are pivotally mounted on pins 119 fixed normal to the axial plane on the drum segment housing 36. A second roller 121 rotatable about a pin fixed at the bend of each link engages the foot 123 of the bead seating segment 54 so that each bead seating segment is moved radially in response to axial movement of the piston 100 to lift the rollers 115.

As shown, the roller 115 is initially positioned on the ramp 112 at a radial distance from the shaft 12 which is less than the radial distance to the outward end 114a of a second ramp 114 which is fixed on the axial end 116 of the first piston 79. Thus the radial excursion of the bead seating segments 52 is independent of and can be greater than the radial excursion of the drum shoulder segments 42 and in turn the radial excursion of the drum shoulder segments 42 is independent of and can be greater than the radial excursion of the bead seating segments 52.

Both are permitted, within the confines of the available space, to have a greater radial excursion than heretofore available.

The second ramp 114 is a solid annular ring having a conical surface, the slope of which can be identical to or different from the slope of the first ramp 112.

The second ramp 114 engages rollers 120 end fixed rotatably in the stemp 40 of the drum shoulder segments 42 so that axial movement of the first piston 79 toward the mid-circumferential plane 22 causes the rollers 120 to move upwardly along the ramp thereby moving the shoulder segments radially with respect to the drum shaft in response to the admission of pressurized air into the chamber 90. Because the two pistons 79, 100 operate each in its own annular chamber independently of one another, both with respect to applied pressure as well as to the timing of the admission of such pressure, the radial movement of the drum shoulder segments is completely independent of the movement of the bead seating segments and thus the drum center membrane need not be subjected to undue stress as in the structures of the mentioned patents. The maximum stroke of the first piston 79 can be determined by the engagement of the radially inner terminus 114b of the ramp with the face 115 formed in the housing 36 rather than by the resistance of the membrane. Lesser radial excursions of the drum shoulder segments can be predetermined by the distance the end assembly 20 is moved by the screw toward the mid-circumferential plane which relieves the tension of the membrane so that the segments can be raised to a new equilibrium with the membrane. In the latter case pressure will be introduced into the chamber 90 which is high enough only to assure a positive drum center expansion against the resistance of the membrane but low enough not to cause strain in the membrane or wear of the drum parts. Moreover the pressure applied in the latter case is independent of the pressure applied in the other chamber 105.

A differing embodiment of the invention is shown in the drum 120, FIG. 2, the parts of which identical to the drum of FIG. 1 have been omitted. The main sleeve member 122 is provided with fixed slide bushings 123 slidably fitted to the center shaft and with a radially extending flange 124 adjacent to the boss 126. An outer cylinder wall 128 is secured to the flange and extends axially to a bolting flange 130 by which it is secured to the drum shoulder housing 36. The cylinder outer wall 128 is provided with a radially inwardly extending flange 133 which terminates inwardly in slidably sealed contact with the cylindrical surface 135 of the first piston 137, the head 139 of which is sealed slidably at the radially inner surface 141 of the cylinder outer wall 128 so that the head 139 of the piston 137 can reciprocate in response to air pressure in the annular chamber 143 between the outward flange 124 and the inward flange 133. The radially inner surface 145 of the first piston 137 is slidably fitted on the radially outer surface 147 of the main sleeve 122. A second piston 150 has its radially inner surface 152 slidably sealed on the radially outer cylindrical surface 135 of the first piston 137 and carries a piston head 154 extending radially outwardly to sealed slidable contact with the radially inner cylindrical surface 156 of the outer wall 128. The first piston 137 has attached at its end remote from the head 139, in a circumferentially spaced plurality of longitudinally extending dovetail slots 158, a corresponding number of inclined ramp members 160, by the cap screws 161, the heads of which are slidable in longitudinal slots 162 formed in the wall of the main sleeve 122 and whereby each of the first ramp members 160 are maintained in axial alignment with the respective rollers 171 of a link member 172 which is pivoted on a pin 173 mounted in the flange 130 of the outer wall 128. A roller 175 mounted on a pin located between the pivot pin 173 and the first roller 171 engages the foot 177 of the bead seating segment leg 179. The second or outer piston 150 has a plurality of longitudinally extending slots 182 each of which accommodates one of the ramp members 160 mounted on the first piston 137, permitting them to be moved axially relative to the second piston 150. The second piston is in turn provided with a circumferentially spaced plurality of ramps 185 respectively between the adjacent pairs of slots such that each ramp is maintained in alignment with an associated roller 187 rotably mounted in the stem 188 of the respective drum shoulder segment whereby the shoulder segments are moved radially in response to the axial movement of the second piston 150. The second piston is moved axially by introduction of air pressure, which may be super-or sub-atmospheric, to the annular chamber 190 introduced by the way of the passage 191 in the outer cylinder wall 128 which passage is connected to valve means 195 for controlling the air to and from the chamber 190. In similar manner, but independently of in time and pressure, pressurized air, which may also be super-or sub-atmospheric, is introduced into the chamber 201 to act on the piston head 139 by a passage 203 in the flange 124 of the main sleeve in communication with valve means 205 for the control of air pressure.

Again the slopes of the ramp members 160 may be the same as or differ from the slopes of the second ramps 185 with respect to the drum shaft.

In both embodiments, i.e., the drum 10, FIG. 1 and the drum 120, FIG. 2, the bead clamp operating means and the shoulder segment operating means are provided within the limited radial space and are operable in complete independence of each other. In the drum 10 the piston 79 for operating the shoulder segments is radially inward of the piston 100 for operating the bead seating means. In the drum 120, the positions of the pistons 137 and 150 are reversed, i.e., the radially inner piston 137 serves to operate the bead seating means and the radially outer piston 150 to operate the drum shoulder segments. Both embodiments provide the objects and advantages referred to above.

The tire building drum is operated by first winding a suitable ply or plies about the cylindrical building surface at the diameter illustrated in FIG. 1 to form a cylindrical band. Other suitable tire building components can optionally be applied. The bead rings are then positioned coaxially about and radially spaced from the band.

In the preferred mode of operation, the bead seating means, in particular the nose ring, is expanded to seat the bead rings in proper axial registry with the carcass band formed on the drum. In the arrangement of FIG. 1, means for expanding the nose ring 72 includes the piston 100 which can be termed then the first piston. In the arrangement of FIG. 2 the nose ring 73 is expanded in response to movement of the piston 137, which thus can also be termed the first piston. Thus, in either arrangement, the first piston is moved axially by compressed air, controlled by the associated valve means 110, 205, and forces the associated roller 115, 171 to move the link 117, 172 and thereby the bead seating segment leg 54 or 179 radially outward to expand the nose ring 73 concentrically of the shaft. The rise of the roller causes the link to pivot about its pivot pin and the radial movement of the roller is thus communicated to the bead seating segment leg each of which legs will be moved equally causing the bead seating segments to expand the nose ring of the turnup bladder so as to compress the ply or plies of the band into uniform circumferential contact with the radial inner surface of the bead sufficiently to indent the nose ring and initiate the conformance of the band about the bead. With an identical but opposite structure of the opposed end (not shown) of the building drum being similarly extended, the axial length of the ply band from bead to bead is thus fixed.

After the beads have been thus fixed in their axial positions relative to the carcass band, the shoulder forming segments and the end regions of the center membrane as well as the overlying carcass band between the beads are expanded, preferably to a greater radial extent than of the band at the respective beads. The drum shoulder segments are expanded in the arrangement of FIG. 1 in response to axial movement of the second piston 79 or, in the arrangement of FIG. 2, the second piston 150. Controlled air pressure is admitted to drive the second piston forward causing the roller of the drum shoulder segment to move radially outwardly as the annular piston is moved axially. Concurrently with the admission of air to move the second piston, the operating screw is actuated to move the drum end assembly a small axial distance toward the mid circumferential plane. The air pressure introduced and the movement of the end assembly are coordinated so that no undue strain is imposed on the drum center membrane. The edge 61 of the membrane, being radially fixed with respect to the center shaft maintains a predetermined longitudinal tension in the membrane which tends to resist the rise of the drum shoulder segments. Hence the pressure of the air introduced is controlled to that only sufficient to maintain the drum end shoulder segments in contact with the membrane as the axial distance between the shoulder and the centerline as is reduced. Since the pressure acting on the piston will be in equilibrium with the resisting tension of the membrane the radial height of the shoulder with respect to the center shaft can be controlled by predetermining the amount of axial movement of the end assembly. Alternatively the travel of the piston can be limited by adjusting the available space between the end of the ramp and the abutment of the housing so as to regulate the maximum lift of the drum shoulder segments.

It is particularly notable that both the time of initiating pressure to move the first and second pistons and the pressure are controlled independently of one another. The drum is thus more adaptable to variations in building technique than heretofore. It is also notable that the radial space available between the outside diameter of the center shaft and the inner diameters of the several rings of the end assembly has been utilized to provide radial travel of the drum shoulder segments and of the bead seating ring segments which is greater in extent than heretofore.

Also of importance is that by making the radial movement of the drum shoulder segments independent of the radial movement of the bead seating ring segments, any tendency for the ply band to be displaced with respect to the bead because of premature elevation of the shoulder segments has been avoided. We have found that the repeated stress applied on the membrane causes the membrane to grow larger therefore changing progressively the desired axial length between the respective bead positions.

By the arrangements described with reference to FIGS. 1 and 2, the respective second pistons 79, 150 can normally be moved their full axial stroke without unduly stressing the center membrane. It is necessary to move the end assemblies inward toward the center plane at least concurrently with the radially outward movement of the shoulder forming segments, to avoid undesired tensions and strain in the center membrane. Because the expansion of the bead seating means in each embodiment is wholly independent of the expansion of the shoulder forming means. The air pressure applied to operate the latter can be selected without regard to the pressure applied to the former. We have found also that it is useful to have the ability to modify the radial force of the bead seating means without simultaneously changing the pressure acting to move the drum shoulder segments.

The diameters of the cylinder surfaces 86, 106 in the outer cylinder wall 50, FIG. 1, as well as the diameters 141,156 of the wall 128, FIG. 2, can be the same, as seen in FIG. 1, or be different as seen in FIG. 2.

The radial force applied to the respective segments is a function of the annular area acting on the respective piston and of the angular slope of the respective ramps. A wide range of actuating force can be readily had by selecting appropriate combinations of slope and area, within the space limitations mentioned above, of the particular building drum.

We claim:

1. A tire building drum having a center shaft and including a center membrane and an inflatable turn-up bladder having an elastic nose ring formed integrally thereof in close axially fixed relation to an associated end of the center membrane to form a flat cylindrical building surface; a rigid drum end assembly including a mounting sleeve mounted coaxially on and slidable along the center shaft; bead seating means arranged coaxially of and spaced circumferentially around said sleeve and mounted in said assembly to expand said elastic nose ring radially of the shaft; drum shoulder forming means mounted in said assembly for movement radially of the shaft to expand said associated end of the center membrane adjacent to said elastic nose ring; first means disposed coaxially of and around said sleeve for movement axially thereof to effect uniform radially outward force and movement of one of said bead seating means and said drum shoulder forming means independently of the other thereof; and second means disposed coaxially of and around said sleeve for movement axially thereof to effect uniform radially outward force and movement of the other of said bead seating means and drum shoulder means independently of said one thereof.

2. A tire building drum as claimed in claim 1, said first means comprising a first annular piston having an inner wall slidably engaging said sleeve and an outer wall, said second means comprising a second annular piston having an inner wall slidably engaging the outer wall of said first annular piston.

3. A tire building drum as claimed in claim 1 or 2 including first inclined ramp means affixed to said first means, roller means on said shoulder means cooperable with said first ramp means to lift said shoulder means radially of said sleeve in response to movement of said first means axially relatively of said sleeve.

4. A tire building drum as claimed in claim 1 or 2 including second inclined ramp means affixed to said second means, link means engagable with said bead seating means and with said ramp means to lift said bead seating means radially of said sleeve in response to axial movement of said second means relatively of said sleeve.

5. A tire building drum as claimed in claim 1 or 2 including first inclined ramp means affixed to said second means, roller means on said shoulder means cooperable with said first ramp means to lift said shoulder means radially of said sleeve in response to movement of said second means axially relatively of said sleeve.

6. A tire building drum as claimed in claims 1 or 2 including second inclined ramp means affixed to said first means, link means engagable with said bead seating means and with said second ramp means to lift the bead seating means radially of said sleeve in response to axial movement of said first means relatively of said sleeve.

7. A tire building drum as claimed in claim 3 wherein the slope of said first ramp means with respect to the drum axis is equal to the slope of the second ramp means with respect to said axis.

8. A tire building drum as claimed in claim 4 wherein the slope of the second ramp means with respect to the drum axis is equal to the slope of the first ramp means with respect to said axis.

9. A tire building drum as claimed in claim 5, wherein the slope of said first ramp means with respect to the drum axis is equal to the slope of the second ramp means with respect to said axis.

10. A tire building drum as claimed in claim 6, wherein the slope of the second ramp means with respect to the drum axis is equal to the slope of the first ramp means with respect to said axis.

* * * * *